(12) United States Patent
Konno et al.

(10) Patent No.: US 9,279,481 B2
(45) Date of Patent: Mar. 8, 2016

(54) CHAIN GUIDE

(71) Applicant: TSUBAKIMOTO CHAIN CO., Osaka-shi, Osaka (JP)

(72) Inventors: Masahiko Konno, Osaka (JP); Yuji Kurematsu, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 290 days.

(21) Appl. No.: 13/947,202

(22) Filed: Jul. 22, 2013

(65) Prior Publication Data

US 2014/0057749 A1 Feb. 27, 2014

(30) Foreign Application Priority Data

Aug. 23, 2012 (JP) ................. 2012-183869

(51) Int. Cl.
*F16H 7/08* (2006.01)
*F16H 7/18* (2006.01)

(52) U.S. Cl.
CPC .. *F16H 7/08* (2013.01); *F16H 7/18* (2013.01); *F16H 2007/185* (2013.01)

(58) Field of Classification Search
CPC ........ F16H 2007/185; F16H 7/08; F16H 7/18
USPC .................................................. 474/111, 140
See application file for complete search history.

(56) References Cited

U.S. PATENT DOCUMENTS

| | | | | |
|---|---|---|---|---|
| 5,318,482 A | * | 6/1994 | Sato et al. | 474/111 |
| 6,758,777 B2 | * | 7/2004 | Young | 474/140 |
| 6,939,259 B2 | * | 9/2005 | Thomas et al. | 474/111 |
| 7,967,708 B2 | * | 6/2011 | Hayami et al. | 474/111 |
| 8,747,263 B2 | * | 6/2014 | Konno et al. | 474/111 |
| 8,888,628 B2 | * | 11/2014 | Konno et al. | 474/140 |
| 2006/0040774 A1 | * | 2/2006 | Hirayama et al. | 474/111 |
| 2006/0172835 A1 | * | 8/2006 | Konno | 474/111 |
| 2006/0205548 A1 | * | 9/2006 | Konno | 474/111 |
| 2013/0095965 A1 | * | 4/2013 | Nakagawa et al. | 474/111 |

FOREIGN PATENT DOCUMENTS

| | | |
|---|---|---|
| JP | 10-292855 A | 11/1998 |
| JP | 2003-247615 A | 9/2003 |
| JP | 2007-40331 A | 2/2007 |
| JP | 2009-036275 A | 2/2009 |

* cited by examiner

*Primary Examiner* — William E Dondero
*Assistant Examiner* — Robert T Reese
(74) *Attorney, Agent, or Firm* — Westerman, Hattori, Daniels & Adrian, LLP

(57) ABSTRACT

There is provided a chain guide capable of preventing a reduction in the durability of the chain guide. In the chain guide in which a base and a shoe are assembled together, a shoe protruding strip formed on a back surface of the shoe is engaged with a base groove that is formed in the base and continuously extends in a longitudinal direction so as to be movable in the longitudinal direction with respect to the base when the shoe expands or contracts, and be able to restrict the movement of the shoe in first and second width directions.

7 Claims, 13 Drawing Sheets

CHAIN GUIDE

BACKGROUND OF THE INVENTION

1. Field of the Invention

The present invention relates to a chain guide that guides a traveling chain.

The chain guide is provided in a chain drive system, and the chain drive system is, e.g., a timing chain drive system used in an engine of an automobile or the like.

2. Description of the Related Art

Conventionally, a chain guide having a shoe with which a traveling chain is in sliding contact and a base that supports the shoe is formed by assembling the shoe and the base together (e.g., see Japanese Patent Application Laid-open No. 2009-36275 (paragraphs 0023 to 0034, all drawings)).

In the chain guide in which the base and the shoe are assembled together, depending on an environment temperature at which the chain guide is used, the shoe expands or contracts in a longitudinal direction of the guide relative to the base due to a difference in thermal expansion/contraction amount in the longitudinal direction of the guide between the base and the shoe. In this case, for example, when the shoe contracts in the longitudinal direction of the guide with respect to the base, if the contraction of the shoe is restricted by the base, a load in the longitudinal direction of the guide (hereinafter referred to as a "restriction load"), e.g., a tensile load acts on the shoe. At this point, if the rigidity of the shoe is small, there are cases where the shoe is damaged by the tensile load when it is increased.

To cope with this, by providing a clearance for absorbing the expansion and contraction of the shoe between the base and the shoe in the longitudinal direction of the guide, the generation of the tensile load is prevented when the shoe expands or contracts within the range of the clearance and, even when the shoe expands or contracts beyond the range of the clearance, the magnitude of the tensile load acting on the shoe is small as compared with a case where the clearance is not provided, and hence it is possible to prevent the damage to the shoe by the tensile load.

However, in a case where the chain guide is unusually or temporarily used at an environment temperature lower or higher than a preset environment temperature due to its use environment, the increased restriction load acts on the shoe, and hence there has been a problem that the durability of the shoe is reduced.

In addition, a force resulting from friction with the chain (hereinafter referred to as a "chain external force") acts on the shoe with which the chain is in sliding contact in a traveling direction, in a counter-traveling direction, or in a width direction of the guide in response to the traveling state of the chain. Further, a force based on the chain external force acts on the engagement portion of the shoe that holds the shoe to the base, and hence it is desirable to improve the capability of the engagement portion to hold the shoe to the base in order to stabilize the travel of the chain in the chain guide.

Further, in a case where a pair of guide side walls provided in the base are used in order to prevent a phenomenon in which the shoe is moved in the width direction of the guide by the chain external force (hereinafter referred to as a "lateral movement phenomenon"), the type of the base to which the shoe having the engagement portion for holding the shoe to the base is assembled is limited. Consequently, there has been a secondary problem that the type of the base to which the shoe can be assembled is limited such as a case where the shoe having the engagement portion cannot be used for the base without the guide side wall.

SUMMARY OF THE INVENTION

The present invention is intended to solve the above problems, and a primary object thereof is to provide the chain guide capable of preventing a reduction in the durability of the chain guide even in the case where the chain guide is used at the environment temperature lower or higher than the preset environment temperature.

In addition, another object of the present invention is to provide the chain guide that improves the convenience of the shoe of which the lateral movement with respect to the base is restricted.

Still another object of the present invention is to provide the guide chain that improves the capability of the engagement portion to hold the shoe to the base.

According to an exemplary aspect of the present invention, there is provided a chain guide comprising: a shoe with which a chain traveling in a traveling direction is in sliding contact; and a base having a support surface that supports the shoe extending in a longitudinal direction, wherein at least a part of the shoe is attached to the base so as to be movable in the longitudinal direction of the shoe, the shoe has a shoe protruding strip that protrudes toward the base from a back surface of the shoe facing the support surface in a second height direction opposite to a first height direction in a height direction, the base has a base groove that is formed in the support surface and continuously extends along the longitudinal direction, and the shoe protruding strip is engaged with the base groove so as to be movable in the longitudinal direction with respect to the base and be able to restrict movement of the shoe in both directions in a width direction.

The shoe protruding strip continuously may extend along the longitudinal direction.

The base may have a fixed base engagement portion and a movable base engagement portion, and the shoe may have a fixed engagement portion that restricts movement of the shoe in the traveling direction by engagement with the fixed base engagement portion of the base, and a movable engagement portion that is engaged with the movable base engagement portion of the base so as to be movable in the longitudinal direction.

Both end portions of the shoe in the longitudinal direction may be an ingress-side shoe end portion on a side of ingress of the chain into the shoe and an egress-side shoe end portion on a side of egress of the chain from the shoe, one end portion of the base in the longitudinal direction may be an ingress-side base end portion on the side of ingress of the chain into the shoe, the fixed engagement portion constituting the ingress-side shoe end portion may be a hook that is engaged with the fixed base engagement portion of the ingress-side base end portion so as to encompass the fixed base engagement portion from the traveling direction and the second height direction, and the shoe protruding strip may be engaged with the base groove of the fixed base engagement portion.

The movable engagement portion may have a height direction protruding portion that protrudes in the second height direction with respect to the back surface of the shoe, the movable base engagement portion may form an engagement hole opened in the support surface, and the height direction protruding portion may be movable in the engagement hole in the longitudinal direction in a state where the height direction protruding portion is inserted into the engagement hole, and restricts the movement of the shoe in the both directions in the width direction by engagement with the movable base engagement portion.

The fixed engagement portion may be engaged with the fixed base engagement portion so as to be movable in a counter-traveling direction opposite to the traveling direction, a longitudinal clearance may be formed at a position close to the fixed engagement portion in the longitudinal direction, between the movable base engagement portion and the movable engagement portion in the longitudinal direction, and a longitudinal length of the clearance when the movable engagement portion may be engaged with the movable base engagement portion in the traveling direction is smaller than a longitudinal engagement length of the fixed engagement portion.

The fixed engagement portion may be a traveling direction engagement portion that is engaged with the fixed base engagement portion in the traveling direction, a counter-traveling direction engagement portion that is engaged with the fixed base engagement portion in a counter-traveling direction opposite to the traveling direction, and a height direction engagement portion that extends in the longitudinal direction and is engaged with the fixed base engagement portion in the first height direction, and the traveling direction engagement portion and the counter-traveling direction engagement portion may couple the back surface of the shoe and the height direction engagement portion so as to sandwich the fixed base engagement portion in the longitudinal direction.

The base and the shoe may be assembled together by forming the base and the shoe by two-material molding or insert molding, and the shoe protruding strip may couple the fixed engagement portion and the movable engagement portion.

Note that, in the present invention, the longitudinal direction corresponds to the longitudinal direction of the guide, the width direction corresponds to the width direction of the guide, and the height direction corresponds to the height direction of the guide.

According to the first aspect of the present invention, the chain guide includes the shoe with which the chain traveling in the traveling direction is in sliding contact, and the base having the support surface that supports the shoe extending in the longitudinal direction, at least a part of the shoe is attached to the base so as to be movable in the longitudinal direction of the shoe, the shoe has the shoe protruding strip that protrudes toward the base from the back surface of the shoe facing the support surface in the second height direction opposite to the first height direction in the height direction, the base has the base groove that is formed in the support surface and continuously extends along the longitudinal direction, and the shoe protruding strip is engaged with the base groove so as to be movable in the longitudinal direction with respect to the base and be able to restrict movement of the shoe in both directions in the width direction, whereby, even in a case where the chain guide is used at an environment temperature lower or higher than a preset environment temperature, the base groove that receives the shoe protruding strip formed on the shoe continuously extends along the longitudinal direction so that the shoe protruding strip is fitted in the base groove in the longitudinal direction and it is thereby possible to prevent a reduction in the durability of the chain guide or damage to the chain guide.

According to the second aspect of the present invention, the shoe protruding strip continuously extends along the longitudinal direction, whereby the rigidity of the shoe is enhanced by the shoe protruding strip and the expansion and contraction of the shoe caused by thermal deformation are restricted by the base. As a result, even in a case where a longitudinal restriction load acts on the shoe having the fixed engagement portion and the movable engagement portion, stress generated in the shoe by the restriction load is reduced and damage to the shoe caused by the load is prevented, and hence it is possible to improve the durability of the shoe, and by extension improve the durability of the chain guide.

In addition, the lateral movement of the shoe with respect to the base caused by the chain external force is restricted and the disconnection of the shoe from the base is prevented by the engagement between the shoe protruding strip and the base groove in the width direction, and hence it is possible to implement the function of restricting the lateral movement in the chain guide by using the shoe for the base without the guide side wall for restricting the lateral movement of the shoe so that the number of types of the base to which the shoe can be assembled is increased and the convenience of the shoe can be improved.

Further, the contact area between the shoe and the base is increased by the contact area between the shoe protruding strip and the base groove, and hence heat radiation from the shoe of which the temperature is increased by frictional heat occurring between the shoe and the chain in sliding contact with the shoe to the base is facilitated without increasing the size of each of the shoe and the base in the width direction, and an increase in the temperature of the shoe is alleviated. Consequently, the thermal degradation of the shoe is suppressed, and the durability of the shoe can be improved.

According to the third aspect of the present invention, the shoe has the fixed engagement portion that restricts the movement of the shoe in the traveling direction by engagement with the fixed base engagement portion of the base, and the movable engagement portion that is engaged with the movable base engagement portion of the base so as to be movable in the longitudinal direction, whereby the movable engagement portion moves in the longitudinal direction with respect to the base, and hence the stress by the restriction load generated in the shoe by restriction on the expansion and contraction of the shoe that expands and contracts relative to the base by the base is reduced, and it is possible to reliably attach the shoe to the base while improving the durability of the shoe.

According to the fourth aspect of the present invention, one end portion of the base in the longitudinal direction is the ingress-side base end portion on the side of ingress of the chain into the shoe, the fixed engagement portion constituting the ingress-side shoe end portion is the hook that is engaged with the fixed base engagement portion of the ingress-side base end portion so as to encompass the fixed base engagement portion from the traveling direction and the second height direction, and the shoe protruding strip is engaged with the base groove of the fixed base engagement portion, whereby the fixed engagement portion engaged with the fixed base engagement portion is provided at the ingress-side shoe end portion of which the lateral movement in both directions in the width direction is restricted by the engagement between the shoe protruding strip and the base groove, and hence the disconnection of the fixed engagement portion from the fixed base engagement portion in the both directions in the width direction is prevented. As a result, the effect of restricting the movement of the shoe in the traveling direction and the first height direction by the fixed engagement portion configured to encompass the fixed base engagement portion is enhanced, and hence it is possible to improve the capability of the fixed engagement portion to hold the shoe to the base, and improve the traveling stability of the chain in the chain guide.

According to the fifth aspect of the present invention, the movable engagement portion has the height direction protruding portion that protrudes in the second height direction with respect to the back surface, the movable base engagement portion forms the engagement hole opened in the support surface, and the height direction protruding portion is movable in the engagement hole in the longitudinal direction when the shoe expands or contracts in the state where the height direction protruding portion is inserted into the engagement hole, and restricts the movement of the shoe in the both directions in the width direction by engagement with the movable base engagement portion, whereby the lateral movement of the shoe in the both directions in the width direction is restricted by the engagement between the movable engagement portion and the movable base engagement portion of the base in addition to the shoe protruding strip, and hence it is possible to improve the effect of restricting the lateral movement of the shoe.

According to the sixth aspect of the present invention, the fixed engagement portion is engaged with the fixed base engagement portion so as to be movable in the counter-traveling direction opposite to the traveling direction, the longitudinal clearance is formed at the position close to the fixed engagement portion in the longitudinal direction, between the movable base engagement portion and the movable engagement portion in the longitudinal direction, and the longitudinal length of the clearance when the movable engagement portion is engaged with the movable base engagement portion in the traveling direction is smaller than the longitudinal engagement length of the fixed engagement portion, whereby the disconnection of the fixed engagement portion from the fixed base engagement portion is prevented even when the chain temporarily moves in the counter-traveling direction and the shoe moves in the counter-traveling direction by the chain external force, and hence it is possible to improve the traveling stability of the chain.

According to the seventh aspect of the present invention, the fixed engagement portion has the traveling direction engagement portion that is engaged with the fixed base engagement portion in the traveling direction, the counter-traveling direction engagement portion that is engaged with the fixed base engagement portion in the counter-traveling direction opposite to the traveling direction, and the height direction engagement portion that extends in the longitudinal direction and is engaged with the fixed base engagement portion in the first height direction, and the traveling direction engagement portion and the counter-traveling direction engagement portion couple the back surface and the height direction engagement portion so as to sandwich the fixed base engagement portion in the longitudinal direction, whereby, when the chain temporarily moves in the counter-traveling direction and the chain external force acts on the shoe in the counter-traveling direction, the movement of the shoe in the counter-traveling direction is restricted by the engagement between the counter-traveling direction engagement portion and the fixed base engagement portion, and hence the movement of the shoe in a fore-and-aft direction in the traveling direction is restricted. As a result, a collision between the traveling direction engagement portion and the fixed base engagement portion when the shoe moves in the traveling direction again is prevented or the impact caused by the collision is alleviated, and the wear of each of the shoe and the base caused by the movement in the fore-and-aft direction is reduced, and hence it is possible to improve the durability of each of the fixed engagement portion and the fixed base engagement portion, and by extension improve the durability of the chain guide. Further, the movement of the shoe from the support surface in the first height direction is prevented, and hence it is possible to improve the traveling stability of the chain.

According to the eighth aspect of the present invention, the base and the shoe are assembled together by forming the base and the shoe by two-material molding or insert molding, and the shoe protruding strip couples the fixed engagement portion and the movable engagement portion, whereby the shoe protruding strip coupling the fixed engagement portion and the movable engagement portion enhances the rigidity of the shoe between the fixed engagement portion and the movable engagement portion in the longitudinal direction. In addition, since the rigidity thereof is enhanced by the shoe protruding strip, the shoe and the base that are difficult to elastically deform can be easily assembled together by two-material molding or insert molding, and hence it is possible to improve the assembling property of the chain guide.

Further, the fixed engagement portion and the movable engagement portion are coupled to the shoe protruding strip, and hence it is possible to enhance the rigidity of each of the fixed engagement portion and the movable engagement portion, enhance the effect of restricting the movement of the shoe by the engagement portions, and improve the capability of the fixed engagement portion and the movable engagement portion to hold the shoe to the base.

DESCRIPTION OF THE PREFERRED EMBODIMENT

The specific configuration of a chain guide according to the present invention may be any configuration as long as the chain guide includes a shoe with which a chain traveling in a traveling direction is in sliding contact and a base having a support surface that supports the shoe extending in a longitudinal direction, at least a part of the shoe is attached to the base so as to be movable in the longitudinal direction of the shoe, the shoe has a shoe protruding strip that protrudes toward the base from the back surface of the shoe facing the support surface in a second height direction opposite to a first height direction in a height direction, the base has a base groove that is formed in the support surface and continuously extends along the longitudinal direction, and the shoe protruding strip is engaged with the base groove so as to be movable in the longitudinal direction with respect to the base and be able to restrict the movement of the shoe in both directions in a width direction, whereby the chain guide is capable of preventing a reduction in the durability of the chain guide even in a case where the chain guide is used at an environment temperature higher or lower than a preset environment temperature.

In the chain guide of the present invention, the chain guided by the chain guide is, e.g., a roller chain or a silent chain.

The chain guide of the present invention is a movable chain guide or a fixed chain guide.

Each of a base forming material as a material for forming the base and a shoe forming material as a material for forming the shoe is a resin (i.e., a synthetic resin), a metal, or a composite material.

Equipment provided with the chain guide of the present invention may be power equipment (inclusive of an engine) that is not for an automobile, industrial equipment, or conveying equipment in addition to power equipment for the automobile (inclusive of the engine).

Embodiments

Hereinbelow, an embodiment of the present invention will be described with reference to FIGS. 1 to 15.

Figure 1:
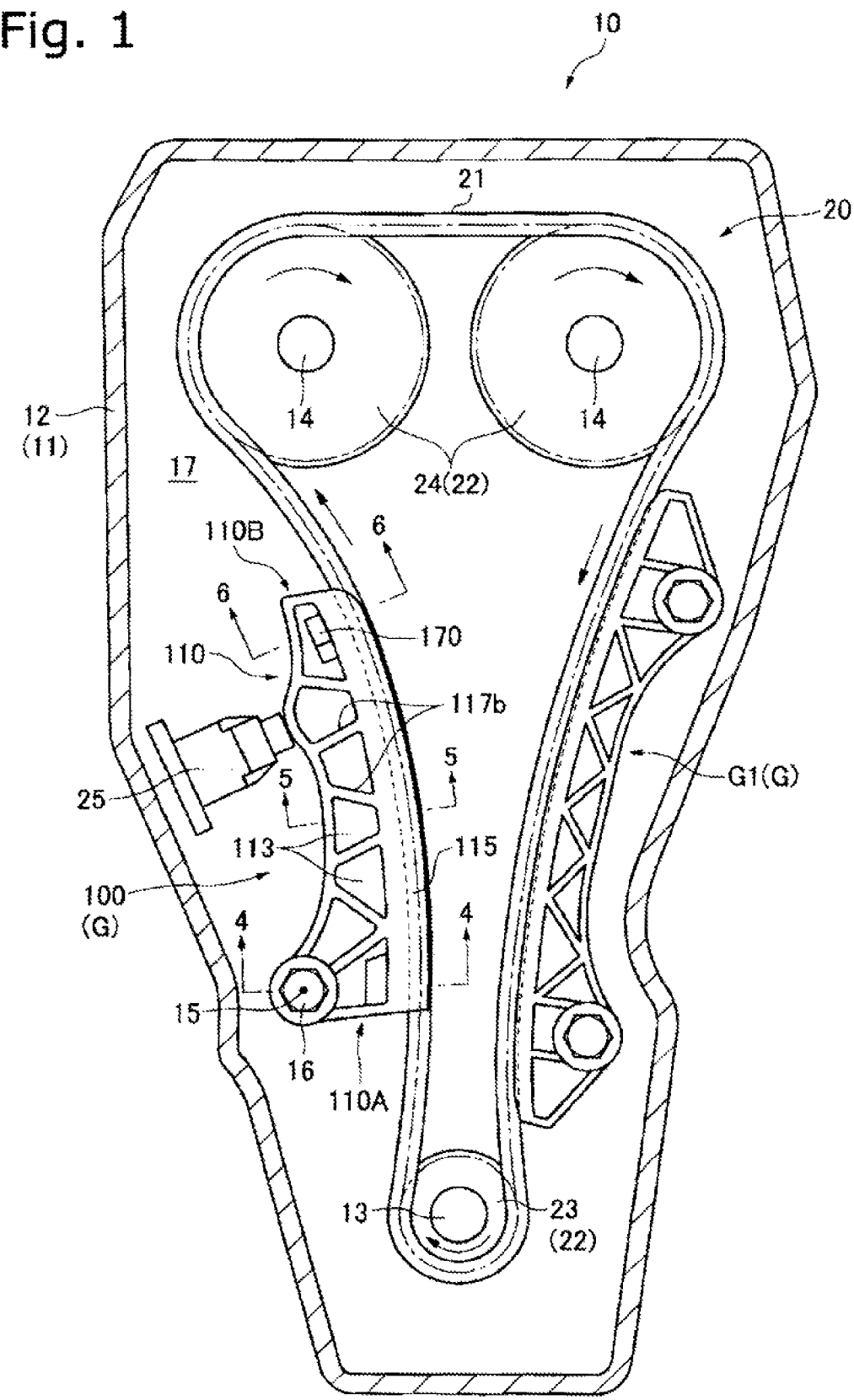
FIG. 1 shows an embodiment of the present invention, and is a schematic overall view of a chain drive system having a chain guide.

Referring to FIG. 1, in the embodiment, a movable chain guide 100 as a chain guide according to the present invention is provided in a chain drive system 20 provided in an automobile engine 10 as equipment. The drive system 20 is a timing chain drive system, and drives the valve mechanism of an internal combustion engine as the engine 10.

The drive system 20 includes an endless chain 21, a sprocket group 22 including a plurality of sprockets 23 and 24 around which the chain 21 is wound, a plurality of chain guides G that guide the traveling chain 21 driven by the sprocket group 22 and include one or more movable chain guides 100 in the present embodiment, and a tensioner 25.

In an engine main body 11 as the main body of the engine 10, the sprocket group 22 provided in an engine block 12 includes a driving sprocket 23 provided on a crankshaft 13 and a pair of driven sprockets 24 provided on a pair of valve camshafts 14. The chain 21 can gear with the sprockets 23 and 24, and transmits the power of the crankshaft 13 to the camshafts 14.

The plurality of chain guides G include the movable chain guide 100 (hereinafter referred to as the "chain guide 100") that guides the traveling chain 21 on its loose side and a fixed chain guide G1 that guides the traveling chain 21 on its tense side and is fixed to the engine main body 11. Each of the chain guides 100 and G1 is constituted by a lever member as a long member elongated in the traveling direction of the chain 21.

The chain guide 100 is supported by a support shaft 16 provided in the engine block 12 so as to be swingable about a swing axis L. The tensioner 25 biases the chain guide 100 to apply tension to the chain 21 via the chain guide 100.

The entire drive system 20 is disposed in a chain chamber 17 that is formed to be oil-tight by the engine block 12 and a chain cover (not shown) that is attached to the engine block 12 and constitutes the engine main body 11 together with the engine block 12, and is lubricated by a lubricating oil supplied from a lubricating oil supply device (e.g., an oil jet) of the engine 10. As a result, the lubricating oil supplied from the lubricating oil supply device is adhered to the chain 21, the sprockets 23 and 24, and the chain guides 100 and G1 that are disposed in the atmosphere of the lubricating oil in the chain chamber 17 filled with lubricating oil droplets.

Referring to FIGS. 1 to 6, the chain guide 100 includes a resin base 110 extending in the longitudinal direction and a resin shoe 150 supported by the base 110 and extending in the longitudinal direction.

The base 110 has a support surface 118 that is in surface contact with and supports a back surface 158 of the shoe 150 along the longitudinal direction and the width direction. The shoe 150 has a travel surface 157 with which the chain 21 traveling in the traveling direction is in sliding contact. The lubricating oil in the chain chamber 17 can enter the space between the support surface 118 and the back surface 158.

The longitudinal direction mentioned herein is a direction in parallel with the traveling direction of the chain 21 that travels while being guided by the travel surface 157 of the shoe 150. The width direction is a direction in parallel with the swing axis L, and is a direction in parallel with the travel surface 157 in a cross section in a plane orthogonal to the longitudinal direction. The height direction is a direction orthogonal to the longitudinal direction and the width direction.

In addition, the cross section denotes the cross section in the plane orthogonal to the longitudinal direction unless otherwise stated.

In the chain guide 100, the base 110 and the shoe 150 are formed so as to be assembled together by forming the base 110 and the shoe 150 by two-material molding as integral molding in which the base 110 and the shoe 150 are integrated by molding in the molding step of the base 110 or the shoe 150.

Specifically, in a mold, the base 110 is formed by injection molding in the first molding step and the shoe 150 is formed by injection molding in the subsequent second molding step, and the shoe 150 is thereby assembled to the base 110.

The resin for the base as the base forming material for the base 110 has a strength higher than that of the resin for the shoe as the shoe forming material for the shoe 150, and is a resin excellent in wear resistance such as, e.g., a fiber-reinforced resin, and an example of the fiber-reinforced resin includes a reinforced polyamide resin containing a glass fiber. On the other hand, the resin for the shoe is a resin excellent in wear resistance and self-lubricity such as, e.g., a polyamide resin that is not fiber-reinforced. As the resin for the base and the resin for the shoe, a non-fusing material with which the base 110 and the shoe 150 are not fused with each other (i.e., are not bonded to each other so as not to be able to move relative to each other) on the condition of the temperature during the molding in the integral molding (two-material molding in the present embodiment) is selected.

The resin for the base and the resin for the shoe have different thermal expansion coefficients and thermal contraction rates during molding, and the thermal expansion coefficient and the thermal contraction rate of the resin for the shoe are larger than those of the resin for the base. In addition, the thermal conductivity of the resin for the base is larger than that of the resin for the shoe.

As a result, the base 110 and the shoe 150 are in contact with each other so as to be able to move relative to each other without being fused with each other on the support surface 118 and the back surface 158. When the base 110 and the shoe 150 expand or contract due to a difference in thermal deformation amount (a thermal expansion and contraction amount resulting from a thermal expansion rate) based on thermal deformation caused by thermal factors such as the thermal expansion rate and the like corresponding to the environment temperature in the environment in which the chain guide 100 is used (in the present embodiment, the temperature of an engine atmosphere of the engine 10 when the engine 10 is operated and stopped), they move relative to each other, and move particularly in the longitudinal direction with the movement amount larger than those in the width direction and the height direction.

The thermal factors mentioned above include the thermal expansion rate and crystallization in a crystalline molding material that are dependent on the environment temperature, and further include the thermal contraction rate during the molding.

The base 110 has a first flange 111 as a shoe support portion that has the support surface 118, a second flange 112 that is spaced apart from the first flange 111 in the height direction, a web 113 that couples the first and second flanges 111 and 112, a pair of guide side walls 114 and 115 that rise from the first flange 111, a base groove 140 equal in number to a shoe protruding strip 180 of the shoe 150 that is formed in the support surface 118 and continuously extends in the longitudinal direction, a boss portion 116 that is supported by the support shaft 16 inserted into a hole 116a, and a plurality of reinforcing ribs 117a and 117b that are disposed on both sides of the web 113 in the width direction and couple the flanges 111 and 112 and the web 113. The guide side walls 114 and 115 restrict meandering of the chain 21 and lateral movement of the shoe 150.

Both end portions 110A and 110B of the base 110 in the longitudinal direction are an ingress-side base end portion 110A on the side of ingress of the chain 21 into the shoe 150, and an egress-side base end portion 110B on the side of egress of the chain 21 from the shoe 150.

The second flange 112 is coupled to the boss portion 116 at the ingress-side base end portion 110A, and has a contact portion 112a with which the tensioner 25 comes in contact at the position adjacent to the egress-side base end portion 110B in the longitudinal direction.

Referring to FIGS. 2 to 8, the shoe 150 has a travel surface forming portion 151 having the travel surface 157 and the back surface 158, a fixed hook 160 as a fixed engagement portion, a movable hook 170 as a movable engagement portion that is movable with respect to the base 110, and one or more shoe protruding strips 180 that are formed on the back surface 158 and arranged in the width direction of the guide, and one shoe protruding strip 180 in the present embodiment.

A pair of side surfaces 181 and 182 and a top surface 183 of the shoe protruding strip 180 having a rectangular cross section are in surface contact with a pair of side wall surfaces 141 and 142 and a bottom surface 143 of the base groove 140 having a rectangular cross section corresponding to the shoe protruding strip 180 so as to be slidable in the longitudinal direction.

The fixed hook 160 restricts the movement of the shoe 150 in a first height direction and the traveling direction by engagement with the base 110, and fixes the shoe 150 in the traveling direction. The movable hook 170 is disposed forward of the fixed hook 160 in the traveling direction, restricts the movement of the shoe 150 in the first height direction by engagement with the base 110, and also moves in the longitudinal direction with respect to the base 110 when the shoe 150 expands or contracts in the longitudinal direction based on thermal deformation.

Note that the first height direction is a direction from the support surface 118 toward the travel surface 157 of the shoe 150 in the height direction. Further, the second height direction is a direction opposite to the first height direction in the height direction.

Both end portions 150A and 150B of the shoe 150 in the longitudinal direction are an ingress-side shoe end portion 150A on the side of ingress of the chain 21 into the shoe 150 and an egress-side shoe end portion 150B on the side of egress of the chain 21 from the shoe 150.

The shoe protruding strip 180 continuously extends in the longitudinal direction from the ingress-side shoe end portion 150A to the egress-side shoe end portion 150B, and protrudes from the back surface 158 toward the base 110 in the second height direction. The shoe protruding strip 180 as the longitudinally protruding strip extending in the longitudinal direction over the entire length of the back surface 158 is engaged with the base groove 140 as a longitudinal groove extending in the longitudinal direction over the entire length of the support surface 118 so as to be movable in the longitudinal direction with respect to the base 110 when the shoe 150 expands or contracts in the longitudinal direction with respect to the base 110, and so as to be able to restrict the movement of the shoe 150 in a first width direction and a second width direction as both directions in the width direction.

Referring to FIGS. 2 to 4 and FIGS. 6 to 9, the ingress-side base end portion 110A has a fixed base engagement portion 120 that is engaged with the fixed hook 160, while the egress-side base end portion 110B has a movable base engagement portion 130 that is engaged with the movable hook 170.

Note that the ingress-side base end portion 110A corresponds to a portion within the longitudinal range from an ingress-side base end surface 110a to the entire fixed base engagement portion 120 in the base 110, while the egress-side base end portion 110B corresponds to a portion within the longitudinal range from an egress-side base end surface 110b to the entire movable base engagement portion 130 in the base 110. Accordingly, the ingress-side base end portion 110A includes the entire fixed base engagement portion 120, and the egress-side base end portion 110B includes the entire movable base engagement portion 130.

Similarly, the ingress-side shoe end portion 150A corresponds to a portion within the range in the longitudinal direction of the guide from an ingress-side shoe end surface 150a to the entire fixed hook 160 in the shoe 150, while the egress-side shoe end portion 150B corresponds to a portion within the range in the longitudinal direction of the guide from an egress-side shoe end surface 150b to the entire movable hook 170 in the shoe 150. Accordingly, the ingress-side shoe end portion 150A includes the entire fixed hook 160, and the egress-side shoe end portion 150B includes the entire movable hook 170.

The ingress-side base end portion 110A and the ingress-side shoe end portion 150A constitute an ingress-side end portion 100A of the chain guide 100, while the egress-side base end portion 110B and the egress-side shoe end portion 150B constitute an egress-side end portion 100B of the chain guide 100.

The fixed base engagement portion 120 has first to third fixed base engagement portions 121, 122, and 123. The first fixed base engagement portion 121 has the support surface 118 and the base groove 140, and is a plate-like protruding portion that protrudes in a counter-traveling direction as a direction opposite to the traveling direction. The second fixed base engagement portion 122 is a planar surface with which the fixed hook 160 is engaged in the second height direction. The third fixed base engagement portion 123 is a planar surface with which the fixed hook 160 is engaged in the traveling direction.

The fixed hook 160, which is a hook that is engaged with the first fixed base engagement portion 121 so as to encompass the first fixed base engagement portion 121 from the traveling direction, has a traveling direction engagement portion 161 that extends in the height direction, and a height direction engagement portion 162 that extends in the longitudinal direction.

Accordingly, the fixed hook 160 cooperates with an ingress-side travel surface forming end portion 151a as a part of the ingress-side shoe end portion 150A in the travel surface forming portion 151 to form a groove space opened in the traveling direction, and the first fixed base engagement portion 121 is fitted in the groove space. Consequently, the fixed hook 160 is engaged with the fixed base engagement portion 120 so as to be movable in the counter-traveling direction as the direction opposite to the traveling direction.

The fixed hook 160 restricts the movement of the shoe 150 in the traveling direction by the engagement between the traveling direction engagement portion 161 and the first fixed base engagement portion 121 in the traveling direction and the engagement between the height direction engagement portion 162 and the third fixed base engagement portion 123 in the traveling direction, and restricts the movement of the shoe 150 in the first height direction by the engagement between the height direction engagement portion 162 and the first fixed base engagement portion 121 in the first height direction.

The movement of the height direction engagement portion 162 in the second height direction is restricted by the engagement between the height direction engagement portion 162 and the second fixed base engagement portion 122 in the second height direction. With this, the traveling direction engagement portion 161 and the height direction engagement portion 162 are prevented from being curbed so as to move away from the first fixed base engagement portion 121 in the counter-traveling direction and the second height direction with the coupling portion of the back surface 158 and the traveling direction engagement portion 161 at the center, and hence the effect of restricting the movement of the shoe 150 in the traveling direction and the first height direction by the fixed hook 160 is enhanced, and it is possible to improve the capability of the fixed hook 160 to hold the shoe 150.

In addition, by the engagement of the height direction engagement portion 162 with the third fixed base engagement portion 123 in the traveling direction, the load in the traveling direction acting on the fixed hook 160 based on the chain external force is dispersed so that it is possible to improve the durability of the fixed hook 160, and by extension improve the durability of the shoe 150.

Referring to FIGS. 2 and 3 and FIGS. 6 to 9, the movable base engagement portion 130 is a hole peripheral edge portion 137 (see FIGS. 6 and 9) constituted by a hole wall surface 138 that forms an engagement hole 139 that is opened in the support surface 118 and into which the movable hook 170 is inserted so as to be movable in the longitudinal direction when the shoe 150 expands or contracts, and a part of a rear surface 119 of the first flange 111, and has first to fourth movable base engagement portions 131, 132, 133, and 134. The engagement hole 139 extends through the first flange 111 in the height direction and extends through the web 113 in the width direction.

Among the first to third movable base engagement portions 131 to 133 formed of the hole wall surface 138, the first movable base engagement portion 131 is an ingress-side hole wall surface extending over the first flange 111, the shoe protruding strip 180, and the web 113, the second movable base engagement portion 132 is an egress-side hole wall surface opposing the first movable base engagement portion 131 in the longitudinal direction and extending over the first flange 111, the shoe protruding strip 180, and the web 113, and the third movable base engagement portions 133 oppose each other in the width direction, and are hole wall surfaces in the first and second width directions (see FIGS. 3 and 6) in the first flange 111.

The fourth movable base engagement portion 134 is a surface on the peripheral edge of the engagement hole 139 in the rear surface 119.

The movable hook 170 is an L-shaped protruding portion having a height direction protruding portion 171 that protrudes in the second height direction with respect to the back surface 158, and a width direction protruding portion 172 that protrudes from the tip portion of the height direction protruding portion 171 in both directions in the width direction or one of both directions therein and, in the present embodiment, the first width direction in the width direction.

The shoe protruding strip 180 extends up to the egress-side shoe end surface 150b from the fixed hook 160, and integrally couples the traveling direction engagement portion 161 and the height direction protruding portion 171.

In a state where the height direction protruding portion 171 as a first movable engagement portion is inserted into the engagement hole 139, the movable hook 170 restricts the movement of the shoe 150 in the counter-traveling direction or the direction of contraction of the shoe 150 by the engagement between the height direction protruding portion 171 that is movable in the longitudinal direction in the engagement hole 139 and the first movable base engagement portion 131 in the counter-traveling direction, restricts the movement of the shoe 150 in the traveling direction or the direction of expansion of the shoe 150 by the engagement between the height direction protruding portion 171 and the second movable base engagement portion 132 in the traveling direction, restricts the movement of the shoe 150 in the first and second width directions by the engagement between the height direction protruding portion 171 and the third movable base engagement portions 133 in the first and second width directions, and restricts the movement of the shoe 150 in the first height direction by the engagement between the width direction protruding portion 172 as a second movable engagement portion and the fourth movable base engagement portion 134 in the first height direction.

Figure 9:
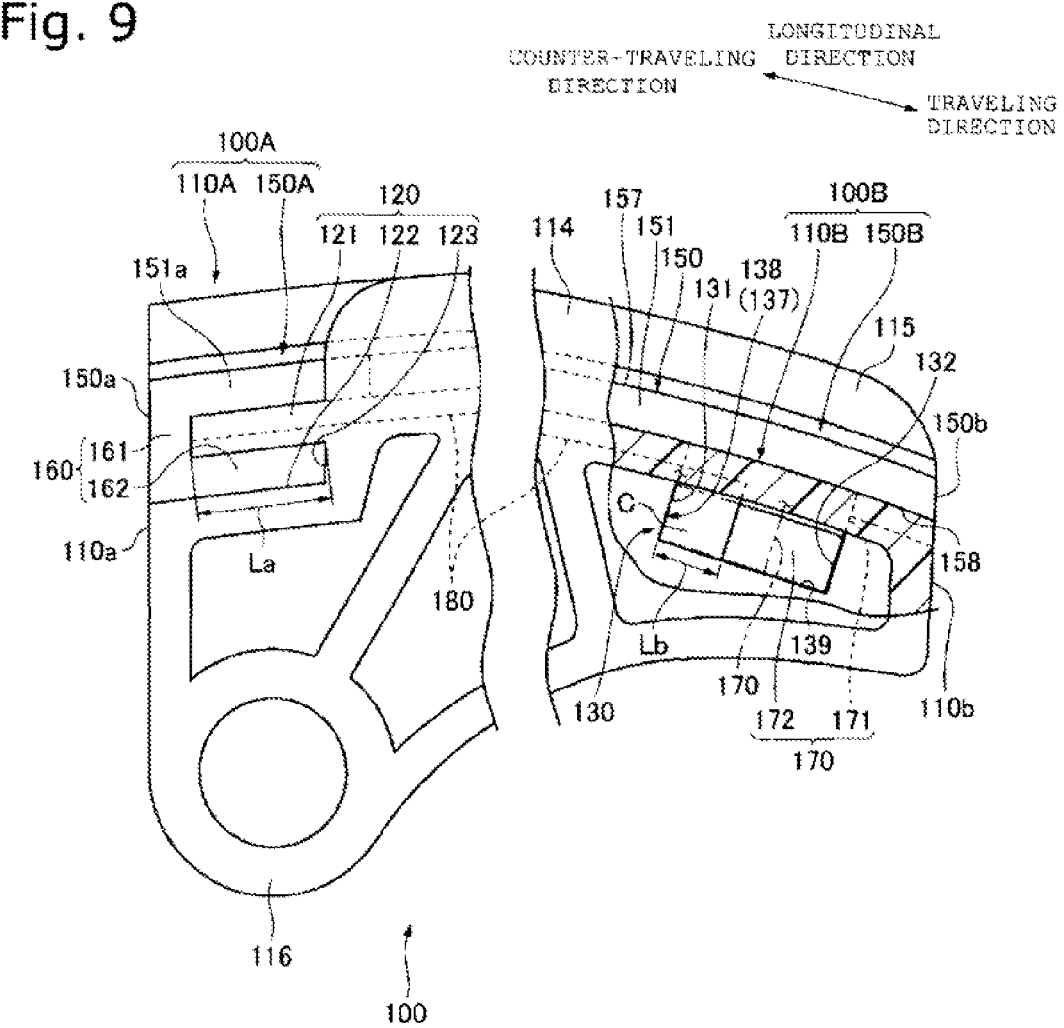
FIG. 9 is a view of a principal portion of the chain guide as seen in the direction of arrow 9a of FIG. 2 and partly in a cross section taken along line 9b-9b of FIG. 6.

Referring to FIG. 9, between the first movable base engagement portion 131 and the height direction protruding portion 171 in the longitudinal direction, a contraction-side clearance C is formed at a position close to the fixed hook 160 in the longitudinal direction. A contraction maximum length Lb as the longitudinal length of the contraction-side clearance C when the height direction protruding portion 171 is engaged with the second movable base engagement portion 132 in the traveling direction is smaller than a longitudinal engagement length La of the height direction engagement portion 162.

Note that, in FIG. 9, the position of the movable hook 170 in a case where the environment temperature when the chain guide 100 is used is not less than a preset high-temperature side predetermined temperature and not more than a set highest temperature is indicated by the solid line, and the position of the movable hook 170 in a case where the environment temperature is not more than a preset low-temperature side predetermined temperature and not less than a set lowest temperature is indicated by the two-dot chain line.

Herein, the preset environment temperature is a temperature not less than the set lowest temperature and not more than the set highest temperature.

When the environment temperature is lower than the high-temperature side predetermined temperature, between the second movable base engagement portion 132 and the height direction protruding portion 171 in the longitudinal direction, an expansion-side clearance (not shown) is formed at a position close to the egress-side shoe end surface 150b in the longitudinal direction. Accordingly, when the environment temperature is lower than the high-temperature side predetermined temperature and higher than the low-temperature side predetermined temperature, the contraction-side clearance C and the expansion-side clearance are formed on both sides of the height direction protruding portion 171 in the longitudinal direction.

Figure 2:
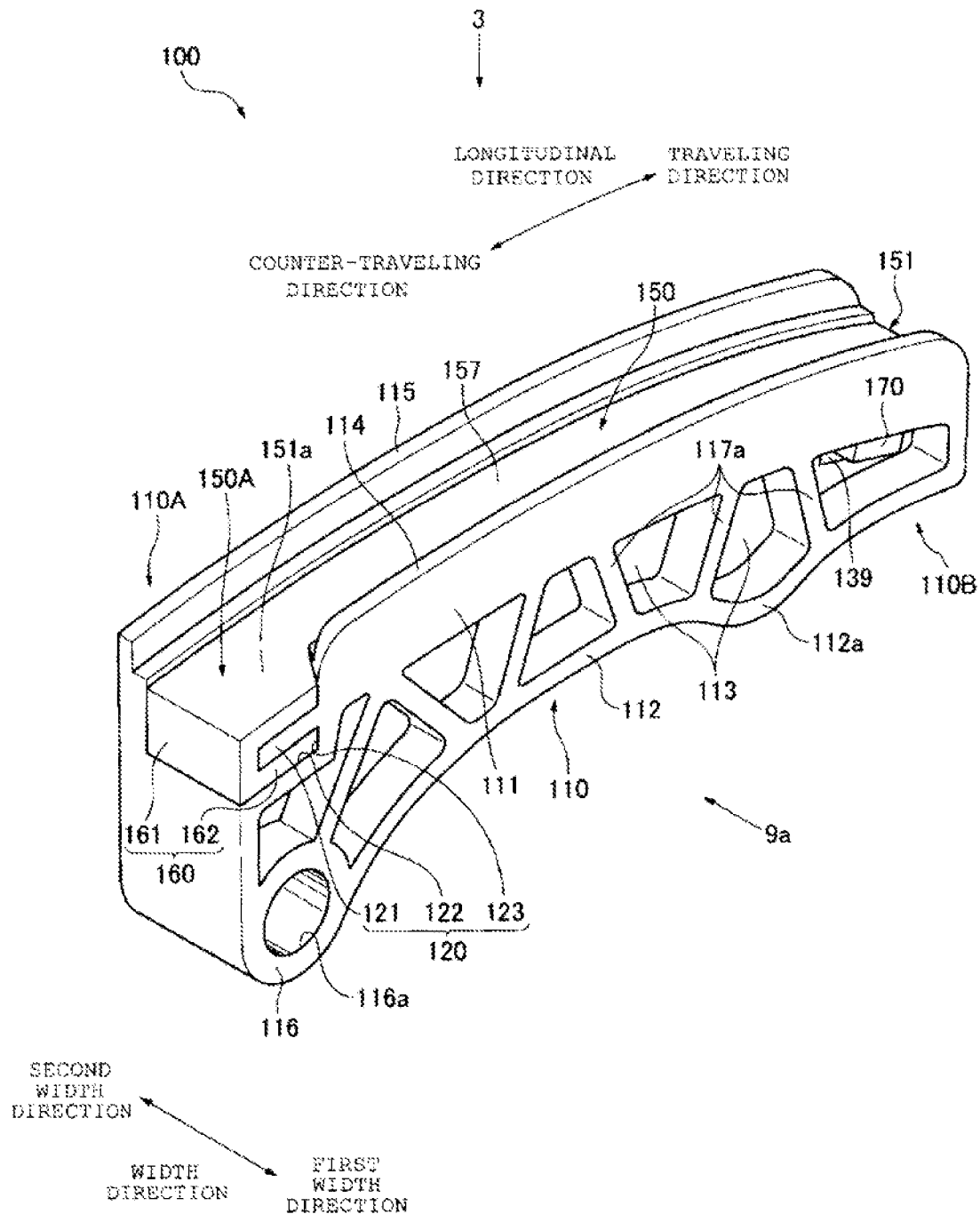
FIG. 2 is a perspective view of the chain guide of FIG. 1.
Figure 3:
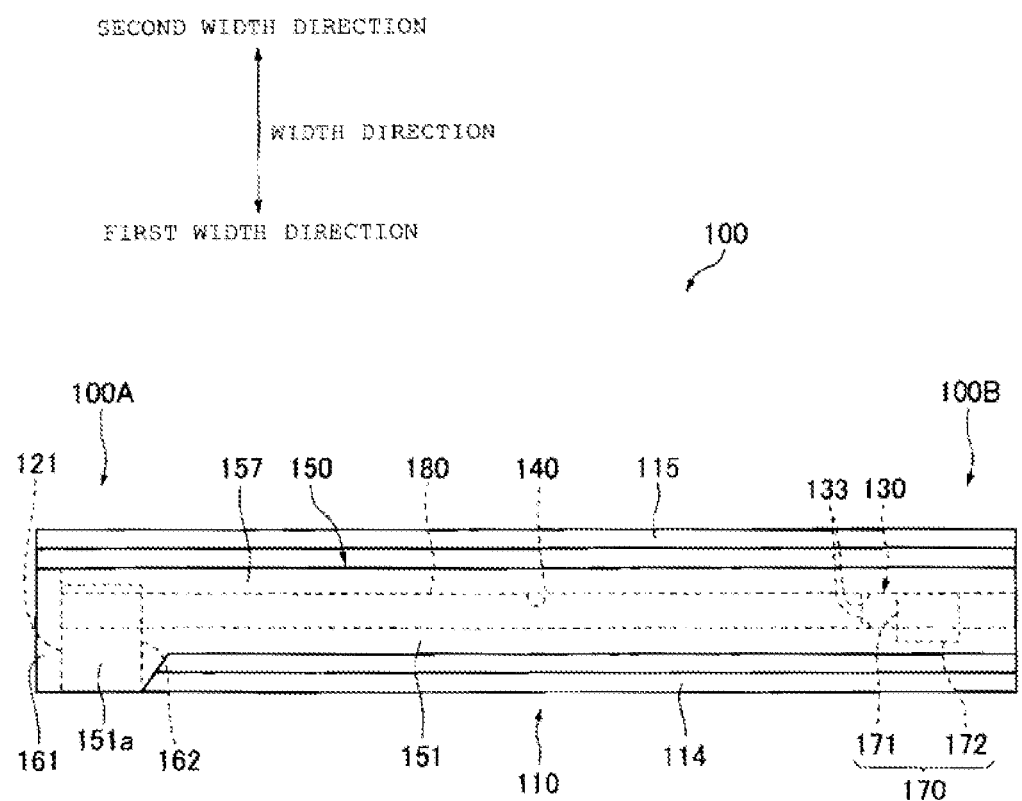
FIG. 3 is a view as seen in the direction of arrow 3 of FIG. 2.
Figure 4:
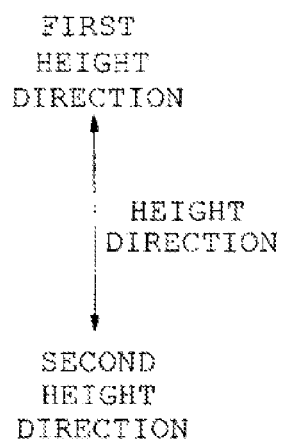
FIG. 4 is a cross-sectional view taken along line 4-4 of FIG. 1.
Figure 4:
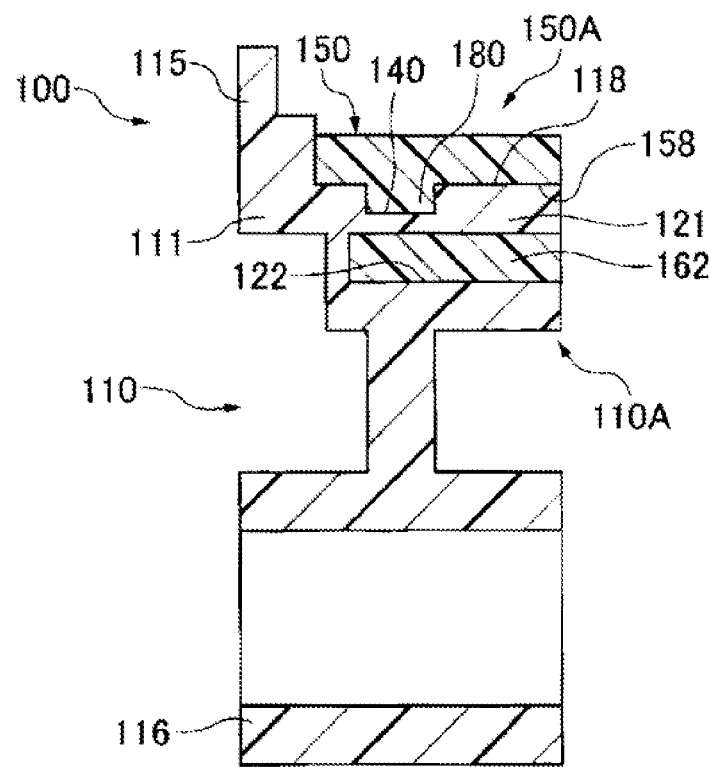
Figure 5:
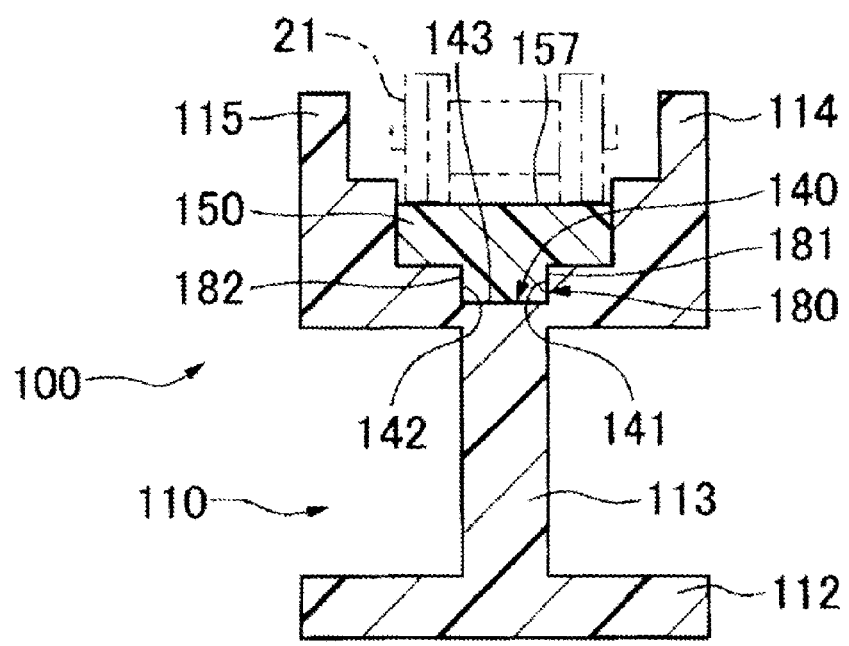
FIG. 5 is a cross-sectional view taken along line 5-5 of FIG. 1.
Figure 6:
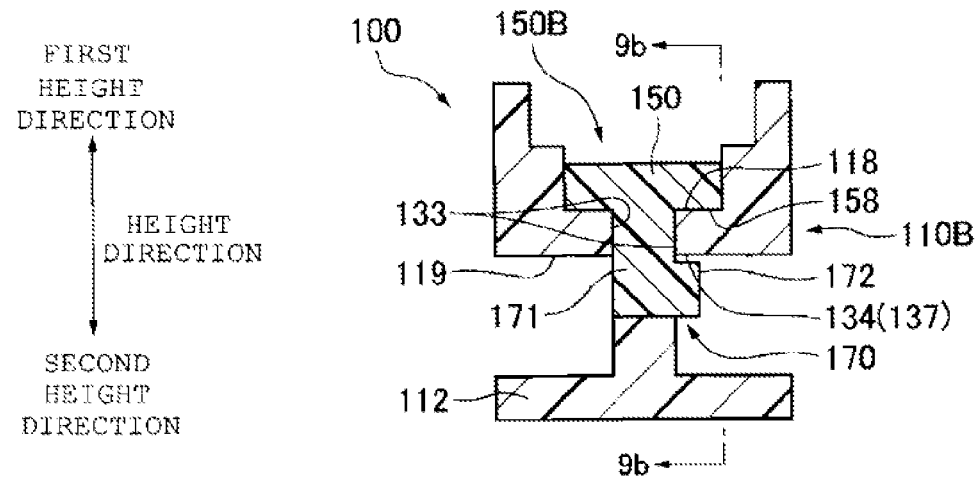
FIG. 6 is a cross-sectional view taken along line 6-6 of FIG. 1.
Figure 7:
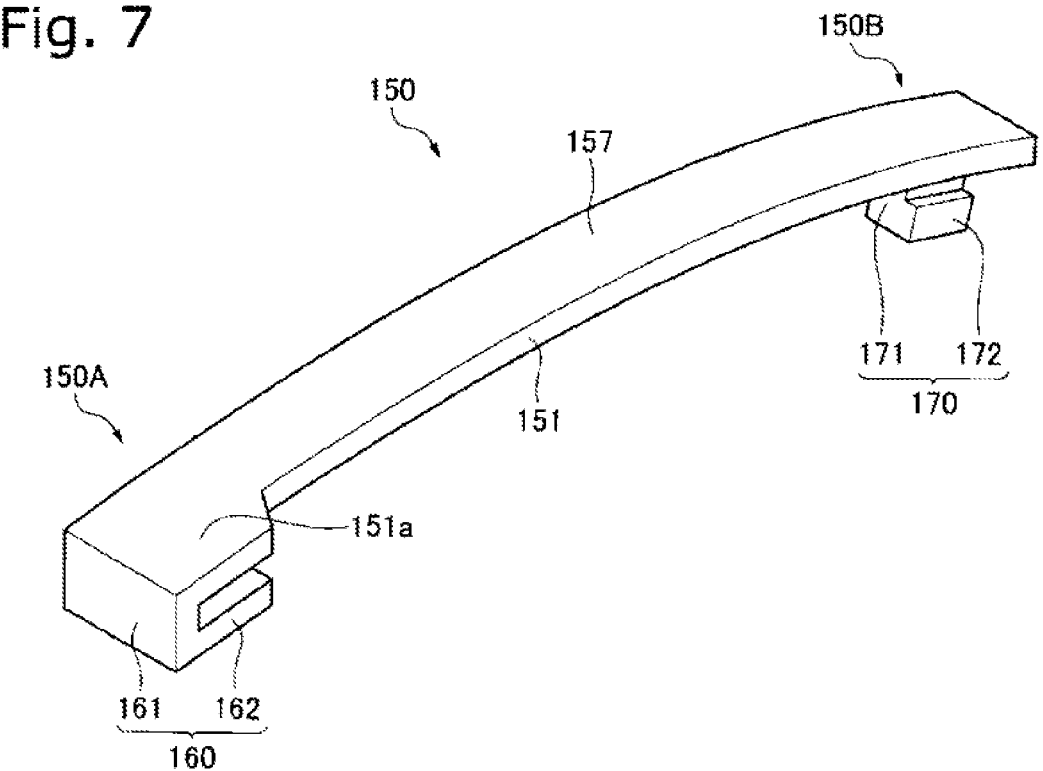
FIG. 7 is a perspective view of a shoe of the chain guide of FIG. 2 as seen from a first height direction.
Figure 8:
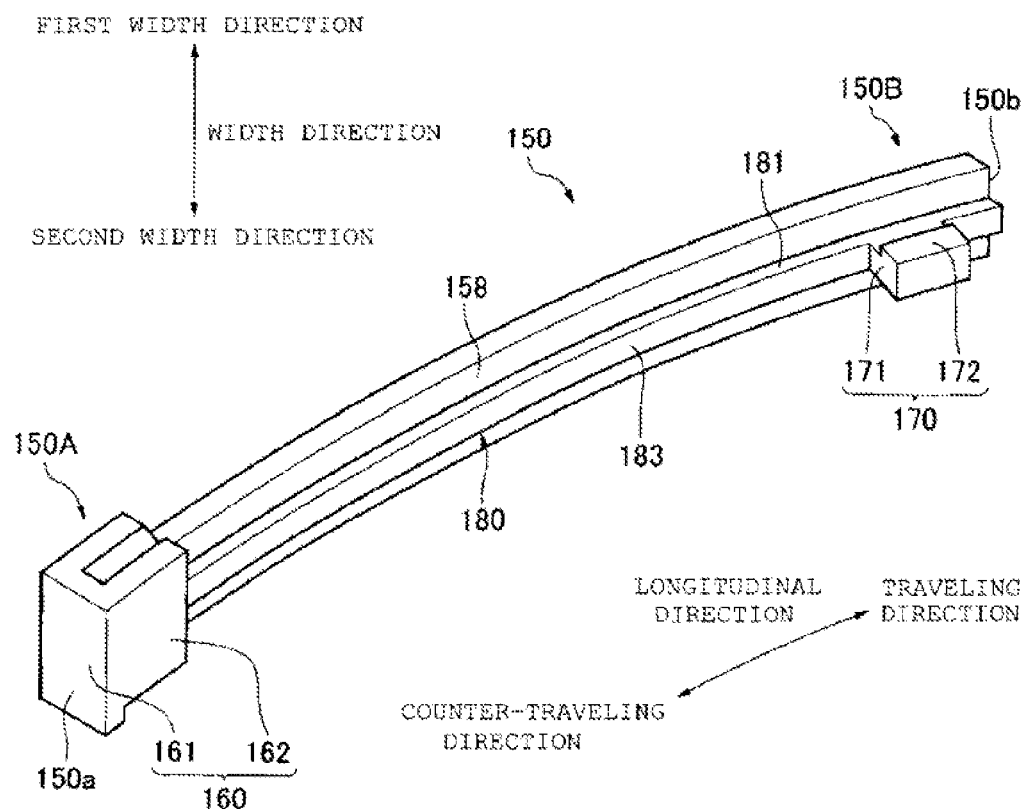
FIG. 8 is a perspective view of the shoe of the chain guide of FIG. 2 as seen from a second height direction.

Referring to FIGS. 2 and 3, the fixed hook 160, the fixed base engagement portion 120, and the ingress-side travel surface forming end portion 151a serve as a widened portion having the width in the width direction larger than the width in the width direction in the portion other than the ingress-side shoe end portion 150A in the shoe 150. Thus, the fixed hook 160 and the fixed base engagement portion 120 serve as the widened portion in the width direction, and the rigidity of each of the fixed hook 160 and the fixed base engagement portion 120 is thereby enhanced so that it is possible to improve the capability of the fixed hook 160 to hold the shoe 150, and improve the durability of each of the fixed hook 160 and the fixed base engagement portion 120.

Referring also to FIG. 1, the fixed hook 160 and the fixed base engagement portion 120 are exposed toward the first width direction as the direction opposing the engine block 12 in the width direction. With this, the lubricating oil flowing along the engine block 12 and the lubricating oil present between the engine block 12 and the chain guide 100 in the width direction become likely to be adhered to the fixed hook 160 and the fixed base engagement portion 120 and enter into the space between the fixed hook 160 and the fixed base engagement portion 120, and hence the wear of each of the fixed hook 160 and the fixed base engagement portion 120 is reduced, and the durability of each of the fixed hook 160 and the fixed base engagement portion 120 is improved.

The ingress-side shoe end portion 150A, i.e., the fixed hook 160 and the fixed base engagement portion 120 protrude in the first width direction as the direction of approach to the engine block 12 in the width direction, and the lubricating oil flowing along the engine block 12 and the lubricating oil present between the engine block 12 and the chain guide 100 in the width direction thereby further become likely to be adhered to the fixed hook 160 and the fixed base engagement portion 120.

Next, the effect of the embodiment thus constituted will be described.

In the chain guide 100 in which the base 110 and the shoe 150 are assembled together, the shoe 150 has the fixed hook 160 that restricts the movement of the shoe 150 in the traveling direction by the engagement with the fixed base engagement portion 120, and the movable hook 170 that restricts the movement of the shoe 150 in the first height direction by the engagement with the movable base engagement portion 130 and is movable in the longitudinal direction when the shoe 150 expands or contracts in the longitudinal direction based on the thermal deformation.

With this, in the shoe 150 having the fixed hook 160 that fixes the shoe 150 in the traveling direction with respect to the base 110 when the shoe 150 expands or contracts with respect to the base 110 due to the thermal deformation of the shoe 150 and the base 110 caused by the thermal factors, since the movable hook 170 moves in the longitudinal direction with respect to the base 110, the stress by the restriction load generated in the shoe 150 by restriction on the expansion or contraction of the shoe 150 that expands or contracts relative to the base 110 by the base 110 is thereby reduced so that it is possible to improve the durability of the shoe 150.

The shoe protruding strip 180, which is formed on the back surface 158 of the shoe 150 and continuously extends in the longitudinal direction from the ingress-side shoe end portion 150A to the egress-side shoe end portion 150B, is engaged with the base groove 140 that is formed in the support surface 118 of the base 110 and continuously extends in the longitudinal direction so as to be movable in the longitudinal direction with respect to the base 110 and be able to restrict the movement of the shoe 150 in the first and second width directions.

With this, the shoe protruding strip 180 provided on the back surface 158 of the shoe 150 continuously extends from one end portion of the shoe 150 to the other end portion thereof, and hence the rigidity of the shoe 150 is enhanced by the shoe protruding strip 180, the stress caused in the shoe 150 by the restriction load is reduced even in the case where the longitudinal restriction load acts on the shoe 150 having the fixed hook 160 and the movable hook 170 by the restriction on the expansion or the contraction of the shoe 150 due to the thermal deformation by the base 110 (e.g., in a case where a longitudinal tensile load acts on the shoe 150 when the shoe 150 contracts with respect to the base 110), and the damage to the shoe 150 caused by the load is prevented so that it is possible to improve the durability of the shoe 150, and by extension improve the durability of the chain guide 100.

In addition, the lateral movement of the shoe 150 with respect to the base 110 caused by the chain external force is restricted and the disconnection of the shoe 150 from the base 110 is prevented by the engagement between the shoe protruding strip 180 and the base groove 140 in the width direction, and hence it is possible to further enhance the effect of restricting the lateral movement in the chain guide 100 by the cooperation with the pair of the guide side walls 114 and 115 for restricting the lateral movement of the shoe 150. Furthermore, it is possible to implement the function of restricting the lateral movement in the chain guide 100 by using the shoe 150 for the base without the guide side walls 114 and 115 for restricting the lateral movement of the shoe 150, and hence the number of types of the base 110 to which the shoe 150 can be assembled is increased, and the convenience of the shoe 150 can be improved.

Further, the contact area between the shoe 150 and the base 110 is increased by the contact area between the shoe protruding strip 180 and the base groove 140, and hence heat radiation from the shoe 150 of which the temperature is increased by frictional heat generated between the shoe 150 and the chain 21 in sliding contact therewith to the base 110 is facilitated, and an increase in the temperature of the shoe 150 is alleviated without increasing the size of each of the shoe 150 and the base 110 in the width direction. Consequently, it is possible to suppress the thermal degradation of the shoe 150 to improve the durability of the shoe 150.

In addition, the lubricating oil can enter into the space between the support surface 118 and the back surface 158, and hence, by the lubricating oil having entered into the space between the surfaces 118 and 158, the heat transfer performance from the shoe 150 to the base 110 is improved, the increase in the temperature of the shoe 150 is alleviated, the wear caused by friction between the support surface 118 and the back surface 158 is reduced, and it is thereby possible to improve the durability of each of the shoe 150 and the base 110.

The fixed hook 160 constituting the ingress-side shoe end portion 150A is engaged with the first fixed base engagement portion 121 of the ingress-side base end portion 110A so as to encompass the first fixed base engagement portion 121 from the traveling direction and the second height direction, and the shoe protruding strip 180 is engaged with the base groove 140 of the first fixed base engagement portion 121.

With this, the fixed hook 160 engaged with the first fixed base engagement portion 121 of the fixed base engagement portion 120 is provided at the ingress-side shoe end portion 150A of which the lateral movement in the first and second width directions is restricted by the engagement between the shoe protruding strip 180 and the base groove 140, and hence, by utilizing the shoe protruding strip 180, the disconnection of the fixed hook 160 from the first fixed base engagement portion 121 in the first and second width directions is prevented. As a result, the effect of restricting the movement of the shoe 150 in the traveling direction and the first height direction by the fixed hook 160 configured to encompass the first fixed base engagement portion 121 is enhanced, and hence it is possible to improve the capability of the fixed hook 160 to hold the shoe 150 to the base 110, and improve the traveling stability of the chain 21 in the chain guide 100.

The height direction protruding portion 171 of the movable hook 170 is movable in the longitudinal direction in the engagement hole 139 when the shoe 150 expands or contracts in the longitudinal direction in the state where the height direction protruding portion 171 is inserted into the engagement hole 139, and also restricts the movement of the shoe 150 in both directions in the width direction by the engagement with the third movable base engagement portions 133 of the movable base engagement portion 130.

With this, the lateral movement of the shoe 150 in the first and second width directions is restricted also by the engagement between the movable hook 170 and the movable base engagement portion 130 of the base 110 in addition to the shoe protruding strip 180, and hence it is possible to improve the effect of restricting the lateral movement of the shoe 150.

The fixed hook 160 is engaged with the fixed base engagement portion 120 so as to be movable in the counter-traveling direction, the contraction-side clearance C is formed between the first movable base engagement portion 131 and the height direction protruding portion 171 of the movable hook 170 in the longitudinal direction, and the longitudinal length of the contraction-side clearance C when the movable hook 170 is engaged with the second movable base engagement portion 132 in the traveling direction, i.e., the contraction maximum length Lb is smaller than the longitudinal engagement length La of the height direction engagement portion 162 of the fixed hook 160.

With this, even when the chain 21 temporarily moves in the counter-traveling direction and the shoe 150 moves in the counter-traveling direction by the chain external force, the disconnection of the fixed hook 160 from the fixed base engagement portion 120 is prevented, and hence it is possible to improve the traveling stability of the chain 21.

The base 110 and the shoe 150 are assembled together by forming the base 110 and the shoe 150 by two-material molding, and the shoe protruding strip 180 couples the fixed hook 160 and the movable hook 170.

As a result, by the shoe protruding strip 180 coupling the fixed hook 160 and the movable hook 170, the rigidity of the shoe 150 between the fixed hook 160 and the movable hook 170 in the longitudinal direction is enhanced. In addition, since the rigidity is enhanced by the shoe protruding strip 180, the shoe 150 and the base 110 that are difficult to elastically deform can be easily assembled together by the two-material molding so that it is possible to improve the assembling property of the chain guide 100.

In addition, since the fixed hook 160 and the movable hook 170 are coupled to the shoe protruding strip 180, the rigidity of each of the fixed hook 160 and the movable hook 170 is enhanced, the effect of restricting the movement of the shoe 150 by the hooks 160 and 170 is enhanced, and the capability of the hooks 160 and 170 to hold the shoe 150 to the base 110 can be improved.

Next, with reference to FIGS. 10 to 15, first to fifth variations of the embodiment of the present invention will be described. Each of the first to fifth variations is partially different from the embodiment in the shoe or the base, and the configuration thereof is otherwise the same as that of the embodiment basically. Accordingly, the description of the portion that is the same as that in the embodiment is omitted or simplified, and the point different from the embodiment will be mainly described. Note that members that are the same as or correspond to those in the embodiment are basically designated by the same names and reference numerals as those in the embodiment.

Figure 10:
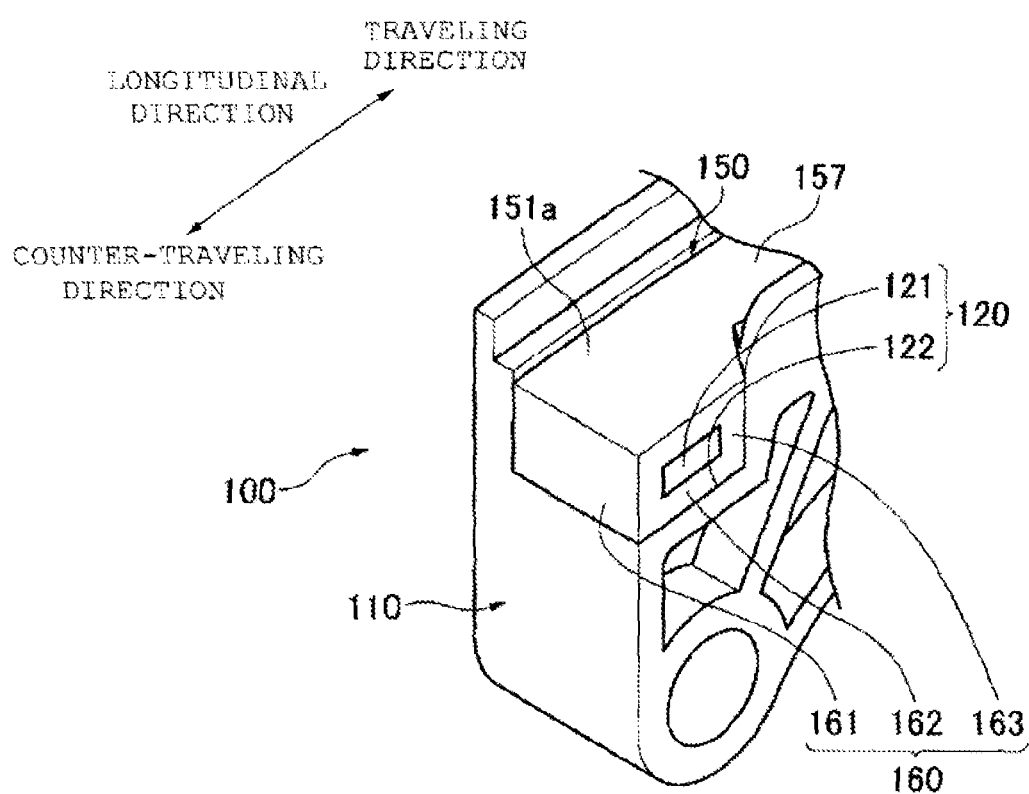
FIG. 10 shows a first variation of the embodiment of FIG. 1, and is a view of a principal portion corresponding to FIG. 2.
Figure 11:
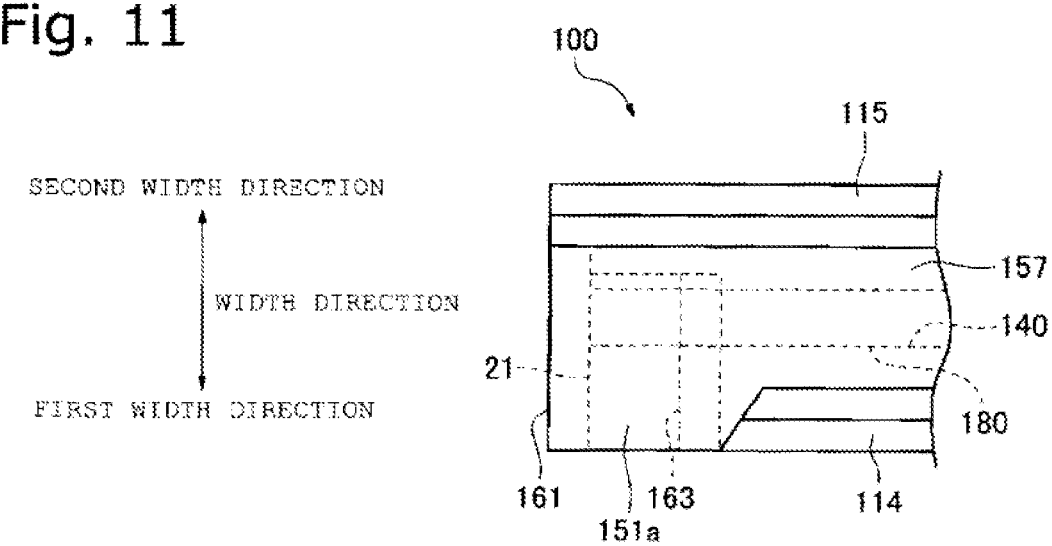
FIG. 11 is a view of a principal portion corresponding to FIG. 3 in the first variation of FIG. 10.

Referring to FIGS. 10 and 11, in the first variation, the fixed hook 160 of the shoe 150 of the chain guide 100 has the traveling direction engagement portion 161, the height direction engagement portion 162, and a counter-traveling direction engagement portion 163 engaged with the first fixed base engagement portion 121 in the counter-traveling direction. The traveling direction engagement portion 161 and the counter-traveling direction engagement portion 163 integrally couple the back surface 158 (see FIG. 8) and the height direction engagement portion 162 so as to sandwich the first fixed base engagement portion 121 in the longitudinal direction. As a result, the first fixed base engagement portion 121 is encompassed by the fixed hook 160 in the traveling direction, the counter-traveling direction, and the second height direction.

Thus, in addition to the traveling direction engagement portion 161 and the height direction engagement portion 162, the fixed hook 160 has the counter-traveling direction engagement portion 163 engaged with the first fixed base engagement portion 121 in the counter-traveling direction, and the traveling direction engagement portion 161 and the counter-traveling direction engagement portion 163 couple the back surface 158 and the height direction engagement portion 162 so as to sandwich the first fixed base engagement portion 121 in the longitudinal direction.

With this, when the chain 21 (see FIG. 1) temporarily moves in the counter-traveling direction and the chain external force thereby acts on the shoe 150 in the counter-traveling direction, the counter-traveling direction engagement portion 163 is engaged with the first fixed base engagement portion 121 to thereby restrict the movement of the shoe 150 in the counter-traveling direction, and hence the movement of the shoe 150 in a fore-and-aft direction in the traveling direction is restricted. As a result, a collision between the traveling direction engagement portion 161 and the first fixed base engagement portion 121 when the shoe 150 moves in the traveling direction again is prevented or the impact caused by the collision is alleviated, and the wear of each of the shoe 150 and the base 110 by the movement in the fore-and-aft direction is reduced so that it is possible to improve the durability of each of the fixed hook 160 and the first fixed base engagement portion 121, and by extension improve the durability of the chain guide 100. Further, the movement of the shoe 150 from the support surface 118 in the first height direction (i.e., floating up of the shoe 150) is prevented by the counter-traveling direction engagement portion 163, and hence it is possible to improve the traveling stability of the chain 21.

Figure 12:
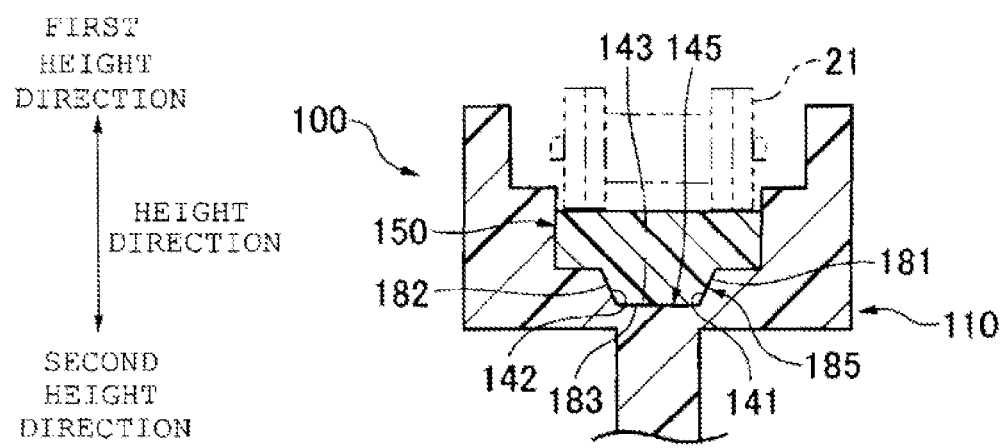
FIG. 12 shows a second variation of the embodiment of FIG. 1, and is a view of a principal portion corresponding to FIG. 5.

Referring to FIG. 12, in the second variation, the cross-sectional shape of a shoe protruding strip 185 of the shoe 150 of the chain guide 100 is a trapezoidal shape protruding from the back surface 158. A pair of side surfaces 181 and 182 of the shoe protruding strip 185 are inclined surfaces having the space therebetween in the width direction that is continuously reduced as it goes in the second height direction. Therefore, the width of the shoe protruding strip 185 in the width direction is reduced toward the second height direction at a specific rate.

A base groove 145 of the base 110 has a cross-sectional shape similar to that of the shoe protruding strip 185, and the pair of side wall surfaces 141 and 142 are inclined surfaces similar to the pair of side surfaces 181 and 182, and are in surface contact with the side surfaces 181 and 182.

Thus, the shoe protruding strip 185 has the pair of side surfaces 181 and 182 as the inclined surfaces having the space therebetween in the width direction that is continuously reduced as it goes in the second height direction, whereby it becomes easier for the shoe protruding strip 185 to fit in the base groove 145 when the shoe protruding strip 185 returns to the base groove 145 after the shoe 150 floats up from the support surface 118 of the base 110 in the first height direction, and hence it is possible to quickly establish the engagement state between the shoe protruding strip 185 and the base groove 145 to improve the traveling stability of the chain 21.

In addition, when the chain 21 pushes the shoe 150 against the base 110 in the height direction, the both side surfaces 181 and 182 of the shoe protruding strip 185 are inclined surfaces and the both side wall surfaces 141 and 142 of the base groove 145 are inclined surfaces substantially the same as the side surfaces 181 and 182, whereby adhesion between the shoe protruding strip 185 and the base groove 145 is enhanced so that it is possible to improve the heat radiation of the shoe 150 to the base 110.

Figure 13:
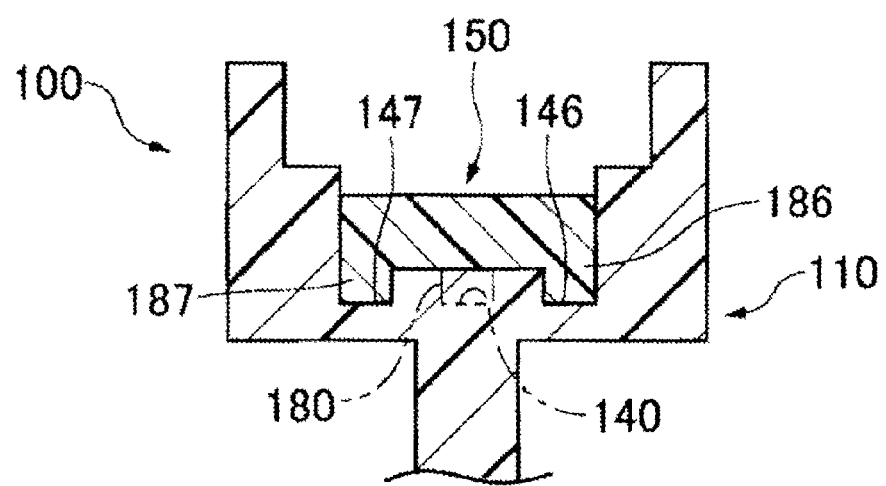
FIG. 13 shows a third variation of the embodiment of FIG. 1, and is a view of the principal portion corresponding to FIG. 5.

Referring to FIG. 13, in the third variation, the shoe 150 of the chain guide 100 has the group of the shoe protruding strip including a plurality of the shoe protruding strips arranged in the width direction, two shoe protruding strips in the third variation, i.e., shoe protruding strips 186 and 187 that are spaced from each other in the width direction. In this case, the movable hook 170 (see FIG. 6) protrudes from the back surface 158 without being coupled to the shoe protruding strips 186 and 187.

On the other hand, the base 110 has the group of the base groove including base grooves 146 and 147 equal in number to the shoe protruding strips 186 and 187 and with which the shoe protruding strips 186 and 187 are engaged. The base grooves 146 and 147 have cross-sectional shapes similar to those of the corresponding shoe protruding strips 186 and 187.

Thus, the shoe 150 has the plurality of the shoe protruding strips 186 and 187 arranged in the width direction, whereby the rigidity of the shoe 150 is further enhanced, the stress generated by the restriction load occurring in the shoe 150 is reduced, and the durability of the shoe 150 can be improved. In addition, the contact area between the shoe 150 and the base 110 is increased as compared with the contact area in the embodiment, and hence it is possible to improve the heat radiation of the shoe 150 to the base 110.

Note that, as another variation, in addition to the pair of the shoe protruding strips 186 and 187, the shoe 150 may further have the shoe protruding strip 180 of the embodiment indicated by the two-dot chain line in FIG. 13, and the base 110 may have the base groove 140.

Figure 14:
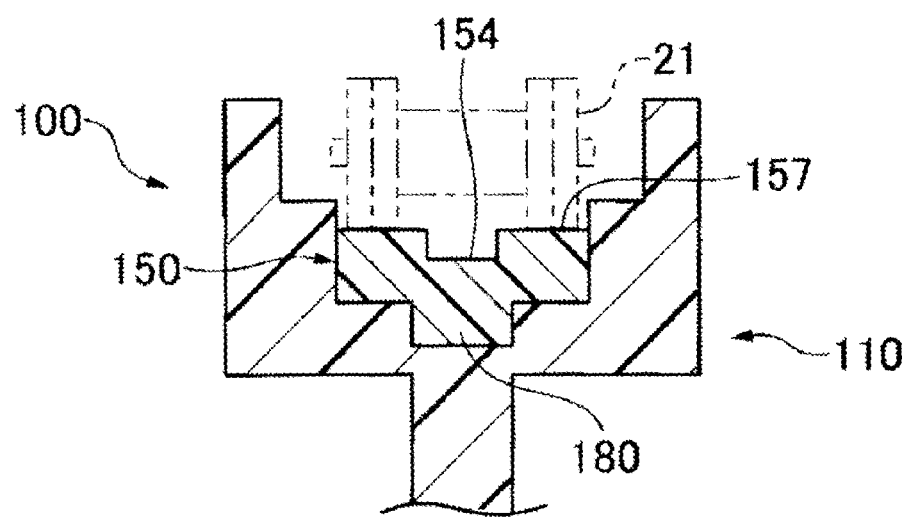
FIG. 14 shows a fourth variation of the embodiment of FIG. 1, and is a view of the principal portion corresponding to FIG. 5.

Referring to FIG. 14, in the fourth variation, the shoe 150 of the chain guide 100 has one or more shoe grooves arranged in the width direction in the travel surface 157, and one shoe groove in the fourth variation, i.e., a shoe groove 154 that is formed into one line and is a groove elongated in the longitudinal direction. The shoe groove 154 is positioned at the center of the travel surface 157 in the width direction, and continuously extends in the longitudinal direction over the entire length of the travel surface 157, or is divided partially or at one or more locations and extends in the longitudinal direction.

The shoe 150 has the shoe groove 154 formed in the travel surface 157, whereby the lubricating oil in the lubricating oil atmosphere in the chain chamber 17 (see FIG. 1) in which the chain 21 and the chain guide 100 are disposed is stored in the shoe groove 154 and the lubricating oil in the shoe groove 154 is supplied to the travel surface 157, and hence the friction between the shoe 150 and the chain 21 is reduced and it is possible to reduce the wear of the shoe 150 and the loss of frictional power in the chain 21.

Figure 15:
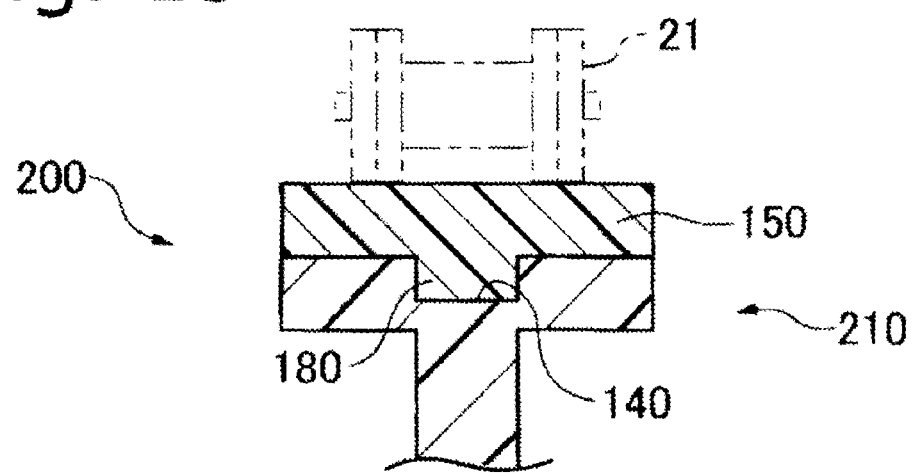
FIG. 15 shows a fifth variation of the embodiment of FIG. 1, and is a view of the principal portion corresponding to FIG. 5.

Referring to FIG. 15, in the fifth variation, a base 210 of a chain guide 200 does not have the pair of the guide side walls 114 and 115 (see FIG. 5) of the embodiment. As a result, the size of the chain guide 200 is reduced in the width direction, and it is possible to avoid the interference of the chain 21 with a widthwise protruding portion provided in the engine block 12 (see FIG. 1) to dispose the chain 21 and the chain guide 200 compactly with respect to the engine block 12 in the width direction.

In the chain guide 200 as well, by the engagement between the shoe protruding strip 180 and the base groove 140 in the first and second width directions, the lateral movement of the shoe 150 is restricted, and it is possible to prevent the disconnection of the shoe 150 from the base 210.

Hereinbelow, with regard to embodiments obtained by partially changing the configuration of each of the embodiment and the variations described above, the changed configuration will be described.

The base forming material may be a metal (as one example, a light metal (e.g., a metal containing aluminum or magnesium)), and the shoe forming material may be a resin. In this case, the base and the shoe may be assembled together by forming the base and the shoe by insert molding as integral molding. The rigidity is enhanced by the shoe protruding strip, and hence the shoe and the base that are difficult to elastically deform can be easily assembled together by the insert molding. Further, the base is formed of the metal, and the effect of the heat radiation from the shoe is thereby improved, and it is possible to further facilitate the alleviation of the increase in the temperature of the shoe.

The movable engagement portion may be disposed rearward of the fixed engagement portion in the traveling direction.

The fixed engagement portion or the movable engagement portion may have a shape other than the shape of the curved hook (e.g., the shape of the portion forming the engagement hole), the fixed base engagement portion may have a shape other than the shape of the protruding portion (e.g., the shape of the portion forming the engagement hole), or the movable base engagement portion may have a shape other than the shape of the portion forming the engagement hole 139 (e.g., the shape of the hook or the protruding portion).

With regard to the chain guide, the shoe may be formed in the first molding step, and the base may be formed in the subsequent second molding step.

When the environment temperature corresponds to the set lowest temperature, the engagement between the height direction protruding portion 171 and the first movable base engagement portion 131 may be started in the counter-traveling direction, or the contraction-side clearance C may be formed. In addition, when the environment temperature corresponds to the set highest temperature, the engagement between the height direction protruding portion 171 and the second movable base engagement portion 132 may be started in the traveling direction, or the expansion-side clearance may be formed. With this, the tensile load caused by restriction on the expansion and contraction of the shoe 150 in the longitudinal direction by the base 110 does not occur at the set lowest temperature and the set highest temperature of the environment temperature, and hence the durability of the shoe 150 is improved.

The base and the shoe may be assembled together by an assembly operation by an operator after being formed as separate members instead of being formed by integral molding.

What is claimed is:
1. A chain guide comprising:
a shoe with which a chain traveling in a traveling direction is in sliding contact; and
a base having a support surface that supports the shoe extending in a longitudinal direction, wherein
at least a part of the shoe is attached to the base so as to be movable in the longitudinal direction of the shoe,
the shoe has a shoe protruding strip that protrudes toward the base from a back surface of the shoe facing the support surface in a second height direction opposite to a first height direction in a height direction,
the base has a base groove that is formed in the support surface and continuously extends along the longitudinal direction, and
the shoe protruding strip is engaged with the base groove so as to be movable in the longitudinal direction with respect to the base and be able to restrict movement of the shoe in both directions in a width direction,
wherein the base has a fixed base engagement portion and a movable base engagement portion,
wherein the shoe has a fixed engagement portion that restricts movement of the shoe in the traveling direction by engagement with the fixed base engagement portion of the base, and a movable engagement portion that is engaged with the movable base engagement portion of the base so as to be movable in the longitudinal direction,
wherein the shoe protruding strip couples the fixed engagement portion and the movable engagement portion.
2. The chain guide according to claim 1, wherein both end portions of the shoe in the longitudinal direction are an ingress-side shoe end portion on a side of ingress of the chain into the shoe and an egress-side shoe end portion on a side of egress of the chain from the shoe,
one end portion of the base in the longitudinal direction is an ingress-side base end portion on the side of ingress of the chain into the shoe,
the fixed engagement portion constituting the ingress-side shoe end portion is a hook that is engaged with the fixed base engagement portion of the ingress-side base end portion so as to encompass the fixed base engagement portion from the traveling direction and the second height direction, and
the shoe protruding strip is engaged with the base groove of the fixed base engagement portion.
3. The chain guide according to claim 1, wherein
the movable engagement portion has a height direction protruding portion that protrudes in the second height direction with respect to the back surface of the shoe,
the movable base engagement portion forms an engagement hole opened in the support surface, and
the height direction protruding portion is movable in the engagement hole in the longitudinal direction in a state where the height direction protruding portion is inserted into the engagement hole, and restricts the movement of the shoe in the both directions in the width direction by engagement with the movable base engagement portion.
4. The chain guide according to claim 1, wherein
the fixed engagement portion is engaged with the fixed base engagement portion so as to be movable in a counter-traveling direction opposite to the traveling direction,
a longitudinal clearance is formed at a position close to the fixed engagement portion in the longitudinal direction, between the movable base engagement portion and the movable engagement portion in the longitudinal direction, and
a longitudinal length of the clearance when the movable engagement portion is engaged with the movable base engagement portion in the traveling direction is smaller than a longitudinal engagement length of the fixed engagement portion.
5. The chain guide according to claim 1, wherein
the fixed engagement portion has a traveling direction engagement portion that is engaged with the fixed base engagement portion in the traveling direction, a counter-traveling direction engagement portion that is engaged with the fixed base engagement portion in a counter-traveling direction opposite to the traveling direction, and a height direction engagement portion that extends in the longitudinal direction and is engaged with the fixed base engagement portion in the first height direction, and
the traveling direction engagement portion and the counter-traveling direction engagement portion couple the back surface of the shoe and the height direction engagement portion so as to sandwich the fixed base engagement portion in the longitudinal direction.
6. The chain guide according to claim 1, wherein
the base and the shoe are assembled together by forming the base and the shoe by two-material molding or insert molding.
7. A chain guide comprising:
a shoe with which a chain traveling in a traveling direction is in sliding contact; and
a base having a support surface that supports the shoe extending in a longitudinal direction, wherein
at least a part of the shoe is attached to the base so as to be movable in the longitudinal direction of the shoe,
the shoe has a shoe protruding strip that protrudes toward the base from a back surface of the shoe facing the support surface in a second height direction opposite to a first height direction in a height direction,
the base has a base groove that is formed in the support surface and continuously extends along the longitudinal direction, and the shoe protruding strip is engaged with the base groove so as to be movable in the longitudinal direction with respect to the base and be able to restrict movement of the shoe in both directions in a width direction, wherein the base has a fixed base engagement portion and a movable base engagement portion, wherein the shoe has a fixed engagement portion that restricts movement of the shoe in the traveling direction by engagement with the fixed base engagement portion of the base, and a movable engagement portion that is engaged with the movable base engagement portion of the base so as to be movable in the longitudinal direction, wherein both end portions of the shoe in the longitudinal direction are an ingress-side shoe end portion on a side of ingress of the chain into the shoe and an egress-side shoe end portion on a side of egress of the chain from the shoe, wherein one end portion of the base in the longitudinal direction is an ingress-side base end portion on the side of ingress of the chain into the shoe, wherein the fixed engagement portion constituting the ingress-side shoe end portion is a hook that is engaged with the fixed base engagement portion of the ingress-side base end portion so as to encompass the fixed base engagement portion from the traveling direction and the second height direction, and wherein the shoe protruding strip is engaged with the base groove of the fixed base engagement portion.

* * * * *